US008625749B2

(12) United States Patent
Jain et al.

(10) Patent No.: US 8,625,749 B2
(45) Date of Patent: Jan. 7, 2014

(54) CONTENT SENSITIVE DO-NOT-DISTURB (DND) OPTION FOR A COMMUNICATION SYSTEM

(75) Inventors: Mukul Jain, San Jose, CA (US); Shmuel Shaffer, Palo Alto, CA (US); Alan D. Gatzke, Bainbridge Island, WA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1904 days.

(21) Appl. No.: 11/277,295

(22) Filed: Mar. 23, 2006

(65) Prior Publication Data

US 2007/0223662 A1 Sep. 27, 2007

(51) Int. Cl.
*H04M 1/64* (2006.01)
*H04M 1/56* (2006.01)

(52) U.S. Cl.
USPC ... 379/70; 379/88.01; 379/88.22; 379/142.06

(58) Field of Classification Search
USPC ........................................... 379/88.01–88.28
See application file for complete search history.

(56) References Cited

U.S. PATENT DOCUMENTS

| | | | | |
|---|---|---|---|---|
| 5,375,161 A | * | 12/1994 | Fuller et al. | 455/417 |
| 5,511,111 A | * | 4/1996 | Serbetcioglu et al. | 379/88.01 |
| 5,594,784 A | * | 1/1997 | Velius | 379/88.02 |
| 5,742,905 A | * | 4/1998 | Pepe et al. | 455/461 |
| 5,802,251 A | * | 9/1998 | Cohen et al. | 704/275 |
| 5,905,774 A | * | 5/1999 | Tatchell et al. | 379/88.04 |
| 5,960,064 A | * | 9/1999 | Foladare et al. | 379/88.26 |
| 5,999,606 A | * | 12/1999 | Weishut et al. | 379/199 |
| 6,047,053 A | * | 4/2000 | Miner et al. | 379/201.01 |
| 6,160,877 A | * | 12/2000 | Tatchell et al. | 379/197 |
| 6,292,799 B1 | * | 9/2001 | Peek et al. | 1/1 |
| 6,327,343 B1 | * | 12/2001 | Epstein et al. | 379/88.01 |
| 6,456,706 B1 | * | 9/2002 | Blood et al. | 379/188 |
| 6,459,780 B1 | * | 10/2002 | Wurster et al. | 379/142.02 |
| 7,136,458 B1 | * | 11/2006 | Zellner et al. | 379/88.02 |
| 7,177,402 B2 | * | 2/2007 | Metcalf | 379/88.03 |
| 7,216,350 B2 | * | 5/2007 | Martin et al. | 719/315 |
| 7,400,712 B2 | * | 7/2008 | August | 379/88.01 |
| 7,443,971 B2 | * | 10/2008 | Bear et al. | 379/210.01 |
| 7,516,320 B2 | * | 4/2009 | Khan et al. | 713/153 |
| 7,835,280 B2 | * | 11/2010 | Pang et al. | 370/230.1 |
| 8,144,850 B2 | * | 3/2012 | Brown et al. | 379/121.04 |
| 8,295,446 B1 | * | 10/2012 | Apple et al. | 379/88.01 |
| 8,340,263 B2 | * | 12/2012 | Rondeau et al. | 379/201.01 |
| 2005/0180547 A1 | * | 8/2005 | Pascovici | 379/88.01 |
| 2007/0211877 A1 | * | 9/2007 | Martin et al. | 379/210.02 |

* cited by examiner

*Primary Examiner* — Joseph T Phan
(74) *Attorney, Agent, or Firm* — Schwegman Lundberg & Woessner, P.A.

(57) ABSTRACT

A method and apparatus is described to process an incoming telephone call. The method may comprise, at a recipient telephone system, receiving the incoming call including speech and identifying when a Do-Not-Disturb option is set. The Do-Not-Disturb option may identify that a user has requested not to receive telephone calls. Content analysis may be performed to identify content of the speech and a reference database may be interrogated based on the content to identify an associated rule. Thereafter, the Do-Not-Disturb option may be selectively overridden based on the associated rule. The content analysis may comprise performing speech recognition on the speech to obtain a reference word/phrase and interrogating the reference database with the word/phrase to identify the associated rule. A method of configuring a Do-Not-Disturb option in a telephone system is also described that allows a user to define reference words and associated rules.

32 Claims, 8 Drawing Sheets

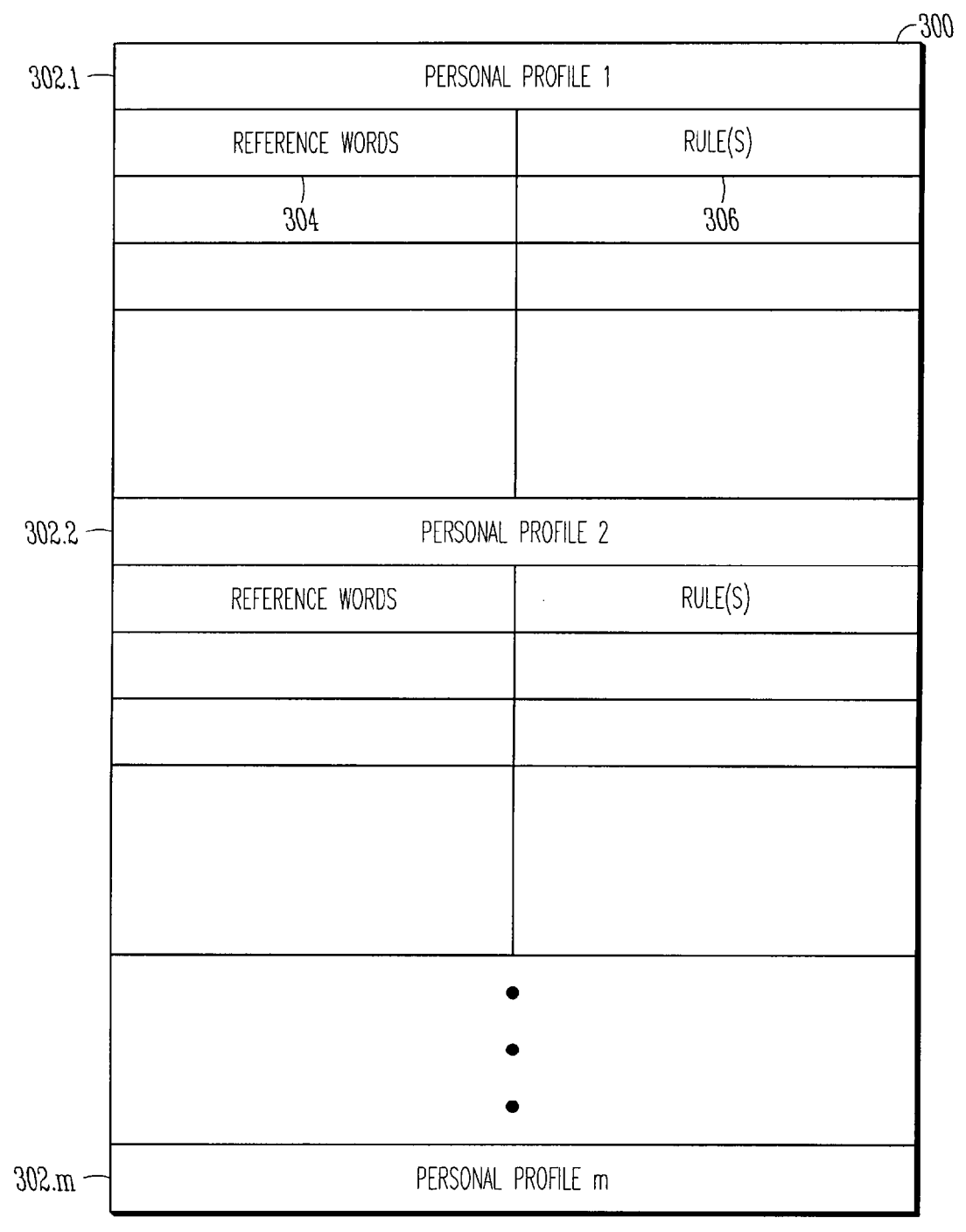

| 300 |
|---|
| PERSONAL PROFILE 1 (302.1) |

| REFERENCE WORDS (304) | RULE(S) (306) |
|---|---|
|  |  |
|  |  |

| PERSONAL PROFILE 2 (302.2) |
|---|

| REFERENCE WORDS | RULE(S) |
|---|---|
|  |  |
|  |  |
|  |  |

•
•
•

| PERSONAL PROFILE m (302.m) |
|---|

*FIG. 3*

CONTENT SENSITIVE DO-NOT-DISTURB (DND) OPTION FOR A COMMUNICATION SYSTEM

FIELD

This application relates to a method and apparatus to process an incoming telephone call. In an example embodiment, the method and apparatus may process an incoming call based on whether or not a Do-Not-Disturb option is enabled in a telephone communication system.

BACKGROUND

A Do-Not-Disturb (DND) feature in a telephone system allows a user to divert all incoming calls to a voicemail box without ringing the user's telephone. This feature allows a user to avoid being disturbed by the telephone call. Typically, when a user enables DND functionality, incoming calls are routed by a separate Private Branch Exchange (PBX) system to a separate and independent voicemail system. The PBX and voicemail system reside on two separate servers.

BRIEF DESCRIPTION OF DRAWINGS

Embodiments of the present invention are illustrated by way of example and not limitation in the figures of the accompanying drawings, in which like references indicate similar elements and in which:

FIG. 3 shows a reference table, in accordance with an example embodiment, including reference words and associated rules for overriding a Do-Not-Disturb option;

DETAILED DESCRIPTION

In an example embodiment, a method and system is described to process an incoming telephone call that is received via a communication network. In the following detailed description of example embodiments, reference is made to the accompanying drawings which form a part hereof, and in which is shown by way of illustration specific embodiments in which the example method, device and system may be practiced. It is to be understood that other embodiments may be utilized and structural changes may be made without departing from the scope of this description.

Figure 1:
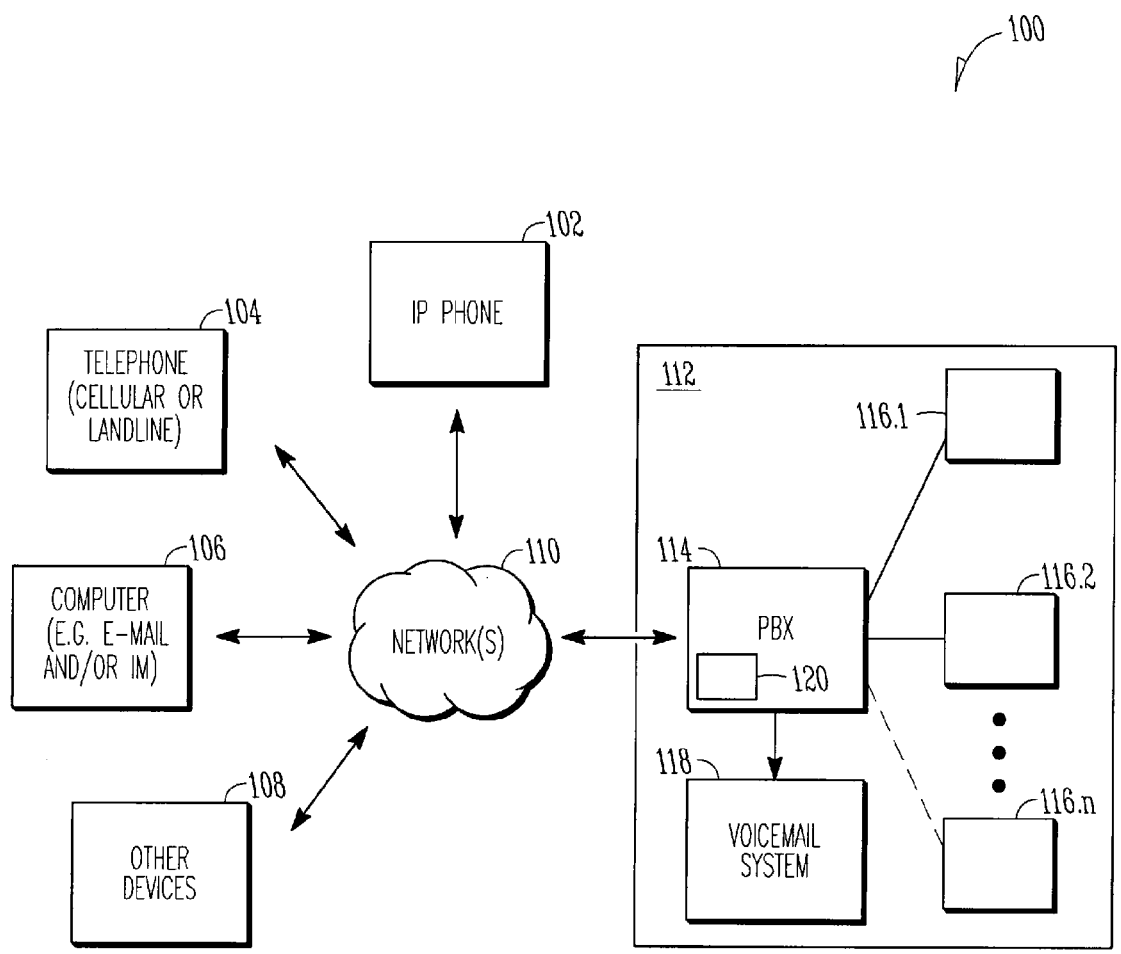
FIG. 1 shows architecture of a prior art system to process incoming telephone calls.

FIG. 1 shows architecture of a prior art system 100 to process incoming telephone calls. The system 100 is shown to include a Voice over Internet Protocol (VoIP) phone 102, a telephone 104 (which may be a cellular telephone, a wired or landline telephone, or the like), a computer 106 (e.g. a personal computer including a soft-phone, an email client, and/ or Instant Message client), or any other devices 108 capable of establishing telephonic communications. The devices 102-108, may communicate via one or more networks 110 with a Private Branch Exchange (PBX) 114 located at customer premises 112. The PBX 114 is shown to service a plurality of telephone endpoints (telephones) 116.1-116.*n* at the customer premises 112 where a separate and independent voicemail system 118 is also provided. In the prior art system 100, when any user associated with a telephony endpoint 116.1-116.*n* activates a Do-Not-Disturb (DND) feature 120, incoming calls from the network 110 for that user are routed directly by the PBX to the voicemail system 118 (a voicemail box of the user). Thus, the Do-Not-Disturb feature 120 identifies when a user services by the PBX 114 has requested not to receive telephone calls.

Example Content Sensitive Do-Not-Disturb

Figure 2:
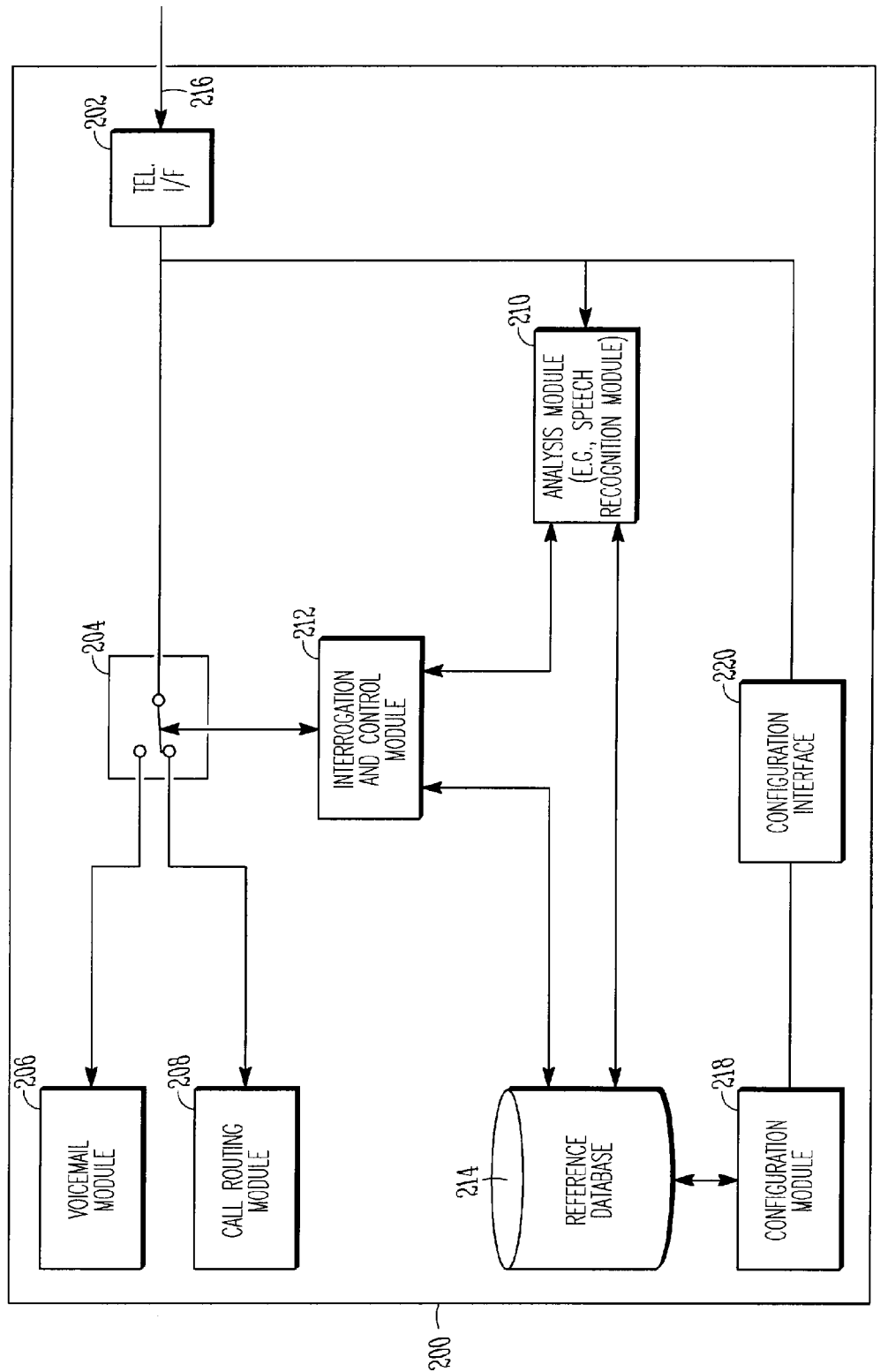
FIG. 2 shows a telephone call management device, in accordance with an example embodiment.

Referring to FIG. 2, reference 200 generally indicates a telephone call management device, in accordance with an example embodiment. The device 200 is shown to include a telephony interface 202 which interfaces the device 200 to a telephone network, for example the telephone network 110 shown in FIG. 1. The telephone network may include a Voice over Internet Protocol (VoIP) network, systems requiring traditional circuit transmissions of a Plain Old Telephone System (POTS), a Local Area Network (LAN) providing telephony communications, a Wide Area Network (WAN) providing telephony communications, or the like. The device 200 is also shown to include a Do-Not-Disturb identification module 204, a voicemail module 206, a call routing module 208 (e.g., providing PBX functionality), an analysis module in the example form of a speech recognition module 210, an integration and control module 212, and a reference database 214. Further, in order to allow a user to configure reference words and rules, as described in more detail below, a configuration module 218 and a configuration interface 220 are provided. In an example embodiment the speech recognition module 210 may be an Adaptive Speech Recognition (ASR) and it will be appreciated that any of the modules of the device 200 may be implemented in hardware or software. However, it should be understood by inclusion that any reference to speech recognition is interchangeable with natural language recognition (or any other speech recognition technology) and the reference words ("hot words") may constitute a phrase that is then recognized.

As described in more detail below, the interrogation and control module 212 may identify when a Do-Not-Disturb option is set on the device 200. The Do-Not-Disturb option identifies that a user of a telephony endpoint serviced by the device 200 has requested not to receive telephone calls. The device 200 may then selectively override the Do-Not-Disturb option based on content of an incoming telephone call provided by a voice path 216. In an example embodiment, the device 200 may programmatically override the Do-Not-Disturb option. It should also be noted that the device 200 may be deployed in devices such as a home telephone answering machine which may only provide a single (or a few) telephone endpoint as well as in any devices deployed in an office environment servicing multiple telephone endpoints.

As shown in FIG. 3, a reference table 300 including a plurality of personal profiles 302.1-302.*m* may be provided. Each personal profile 302.1-302.*m* may include "hot words" or reference words 304, and each reference word 304 may have an associated rule 306. In use, as described in more detail below, the interrogation and control module 212 may extract or identify content of speech in the voice path 216 of an incoming call and identify an associated reference word 304 and its corresponding rule 306 may then be executed. Thus, the device 200 allows selective overriding of a Do-Not-Disturb option based on a reference word spoken by an incoming caller. As described in more detail below, a user associated with a personal profile 302.1-302.m may define his/her own hot words and associated or corresponding rules. Further, it will be appreciated that the embodiments are not restricted to a single word. One or more words (e.g., forming phrase) may be recognized and be provided in the table 300. Furthermore it should be recognized that the device 200 may contain global words and rules which apply to all users and that a system administrator may have the ability to modify the global words and rules and/or the words and phrases associated with each user.

Figure 4:
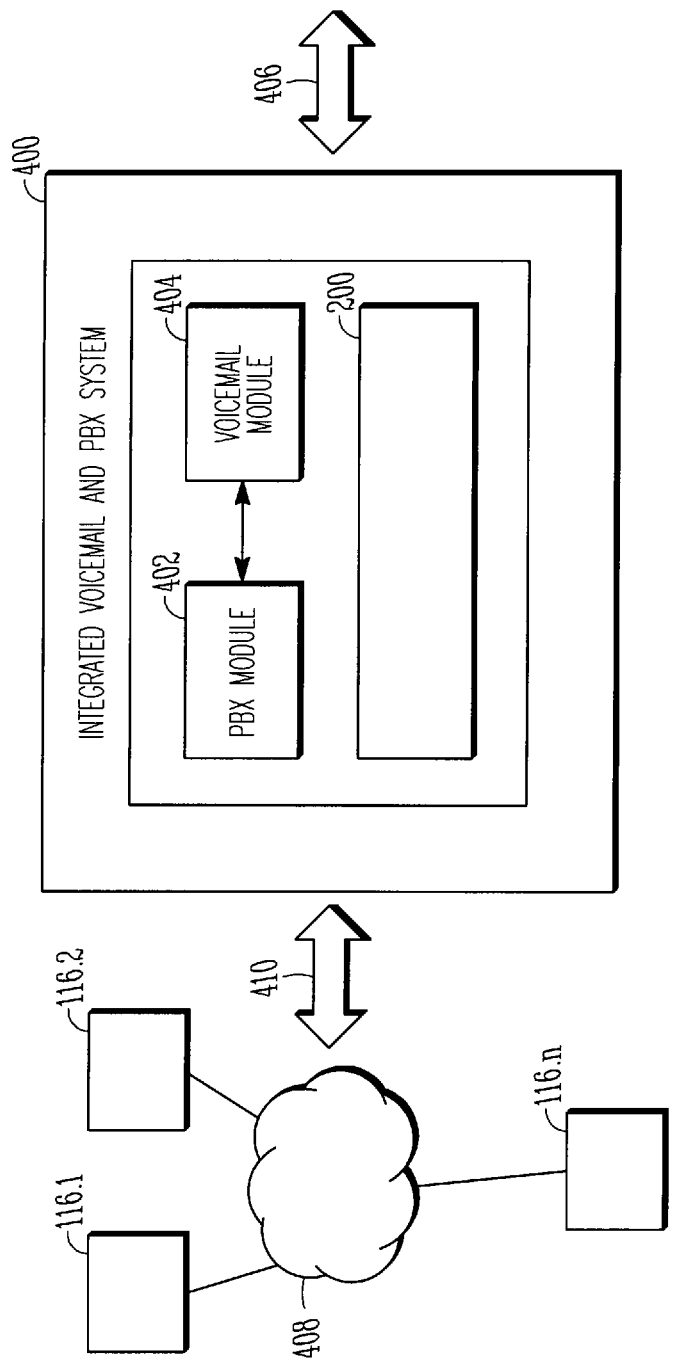
FIG. 4 shows an integrated voicemail and PBX system in accordance with an example embodiment.

FIG. 4 shows an integrated voicemail and PBX system 400, in accordance with an example embodiment. The system 400 provides a single integrated unit including a PBX module 402 and a voicemail module 404. Unlike the prior art system 100 where the PBX 114 and the voicemail system 118 are provided as two separate units in two separate boxes (e.g. on two separate servers), the system 400 is fully integrated within a single device or server. Accordingly, in use, calls received by the system 400 are not routed from a PBX to a separate voicemail system thereby preventing a call from being re-routed to a telephony endpoint 116.1-116.n once a feature such as Do-Not-Disturb has been activated. Thus, in accordance with an example embodiment, the PBX and the voicemail components are fully integrated. This can be achieved either by systems/components which are co-located on the same server or via two servers attached to the same network 110.

Accordingly, in an example embodiment, an incoming call received by the system 400 may be recorded by the voicemail module 404 (e.g., when the Do-Not-Disturb option is active). However, as the PBX module 402 and the voicemail module 404 are tightly integrated, the call may then, while the voicemail module 404 is recording the incoming call, be routed or patched through to an associated telephony endpoint 116.1-116.n. For example, the system 400 may include the device 200 which allows selective overriding of the Do-Not-Disturb option based on reference words (e.g., provided in the table 300). When the system 400 includes the device 200, the voicemail module 404 may correspond to the voicemail module 206 to provide a single integrated voicemail module. Thus, the system 400 may be interfaced to a regular telephony trunk as shown by arrow 406 and connected via a telephony network 408 (see arrow 410) to the plurality of telephony endpoints 116.1-116.n.

Figure 5:
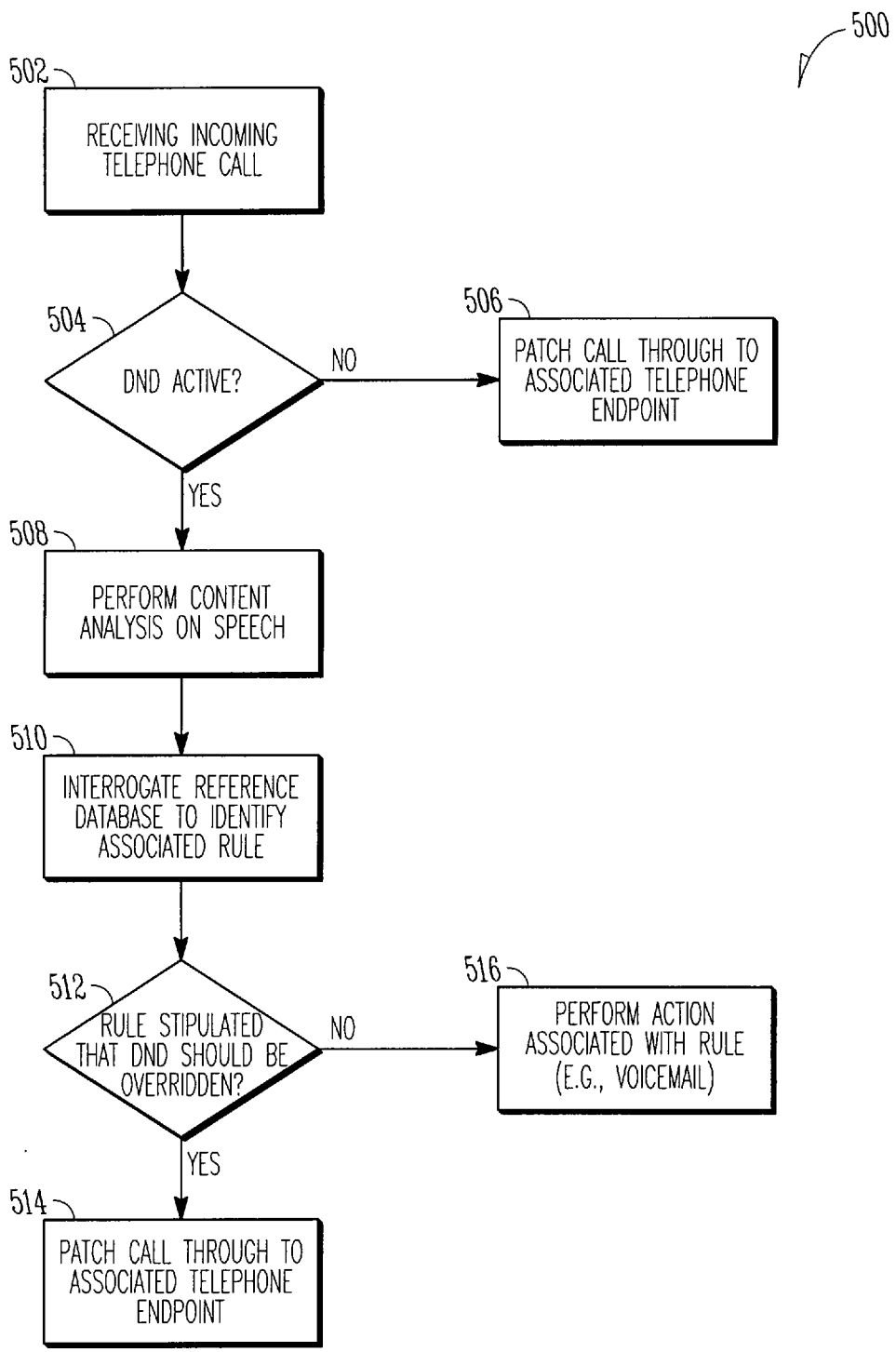
FIG. 5 shows a flow diagram of a method, in accordance with an example embodiment, of processing an incoming call in a telephony device.

Referring to FIG. 5, reference 500 generally indicates a method, in accordance with an example embodiment, of processing an incoming call in a telephony device. The method 500 may be performed on the device 200 and, accordingly, is described by way of example with reference to the device 200. As shown at block 502, an incoming call may be received (see voice path 216 in FIG. 2) and a determination may then be made (see decision block 504) if a Do-Not-Disturb option associated with the telephony endpoint to which the incoming call is bound is active. As shown at block 506, if the Do-Not-Disturb function is not active, then the telephone call may be patched through to the associated telephone endpoint by a PBX (e.g. the PBX 402 shown in FIG. 4). Thus, in an example embodiment, when the Do-Not-Disturb option is not active at a PBX, incoming calls may be handled or processed in a conventional fashion.

However, when the Do-Not-Disturb option is active, content analysis may be performed on speech of the incoming telephone call (see block 508) while the message is being recorded by, for example, the voicemail module 404. For example, as described in more detail below, speech recognition may be performed on speech of a person making the incoming call to obtain at least one reference word. In an example embodiment, adaptive speech recognition may be performed thus providing a textual input from an audio input. It is however to be appreciated that the analysis may instead be performed in the audio domain.

As shown at block 510, the method 500 may interrogate a reference database (e.g. the reference database 214) to identify a rule associated with the speech content. For example, when adaptive speech recognition is used to obtain a textual equivalent of the speech, reference words or hot words may be identified and the database 214 may be interrogated to identify whether or not the reference words are present in the relevant personal profile 302.1-302.m (see table 300). If a particular reference word is not found in the reference database 214, the call may be processed in a conventional fashion where it is communicated to the voicemail module 404 to record a voicemail message (see block 516). However, if the reference word (or a reference phrase) are identified in the personal profile 302.1-302.m, an associated rule 306 may then be identified and any action associated with the rule may be performed. In an example embodiment, the reference words may be stored in an XML format in the database 214.

As shown at decision block 512, if the associated rule stipulates that the Do-Not-Disturb option should be overridden, then the incoming call may be patched through to the associated telephone endpoint as shown at block 514. If, for example, a user at the telephone endpoint is currently busy with another telephone call, the method 500 may communicate an indication to the user that another call is pending. For example, the method 500 may provide an audio communication to the user at a reduced volume level that is lower than the volume level of the voice communication of the other telephone call to inform the user of the incoming call. Thus, the method 500 may provide a "whisper" mode whereby the user at the telephony endpoint is advised of a new incoming call. Examples of other rules may include but is not limited to transferring the caller to the called destination, transferring the caller to another extension which is best suited to handle the case, or invoke phone screening feature to facilitate potential manual cancellation of the DND feature.

Returning to decision block 512, if, however, the rule stipulates that the Do-Not-Disturb option should not be overridden then the method 500 may perform an action associated with the rule. For example, the rule may stipulate or specify that the incoming call should continue to be processed by a voicemail system such as the voicemail module 206.

It will be appreciated that the selective overriding of the Do-Not-Disturb option may be performed at multiple levels. For example, specific reference words within the incoming telephone call may correspond to or be associated with different rules. For example, assuming the device 200 is deployed in a medical doctor environment, any caller using the word "heart attack" may result in the method 500 overriding the Do-Not-Disturb option irrespective of who the caller is. However, in an example embodiment, the reference words may identify the caller (e.g., be a caller's name) and, thus, when a call is received from a particular caller identified in the reference database 214, the Do-Not-Disturb option may be selectively overridden. Thus, a user may define when the Do-Not-Disturb option is overridden based on an identity of the caller and/or the actual content of the speech.

Figure 6:
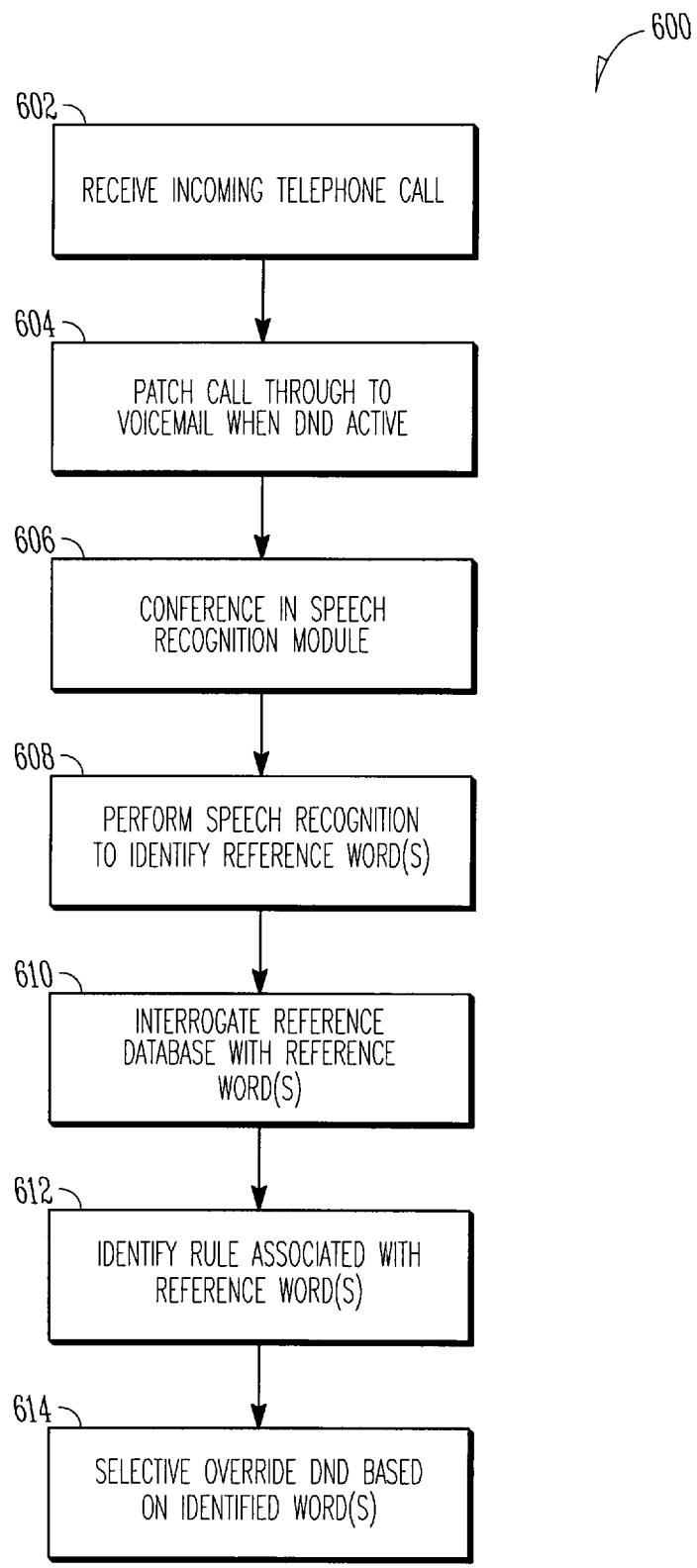
FIG. 6 shows a flow diagram of a method, in accordance with an example embodiment, for processing an incoming telephone call where an incoming call is conferenced in with a speech recognition module.

Reference 600 (see FIG. 6) generally indicates a method, in accordance with an example embodiment, for processing an incoming telephone call. As shown at block 602, an incoming call may be received and the call may be patched through to a voicemail system when a Do-Not-Disturb option is active (see block 604). In addition to communicating the incoming voice call to the voicemail system, the incoming call may be patched through (e.g. using a conference in feature) to a speech recognition module (e.g. the speech recognition module 210) as shown at block 606. Thus, in an example embodiment, the method may be deployed in legacy systems (e.g., the system 100 shown in FIG. 1) using existing conference functionality.

Thereafter, as shown at block 608, speech recognition (e.g. adaptive speech recognition) may be performed to identify reference words or phrases in the incoming speech. The reference words or phrases may identify a caller and/or a content of a message communicated by the caller. Once the reference words have been identified, as described hereinbefore, the method 600 may interrogate a reference database with the reference words (see block 610). Thereafter a rule is identified that is associated with the reference words as shown at block 612. As shown at block 614, the Do-Not-Disturb option may be overridden. In an example embodiment, the method 600 may be deployed in a conventional or prior art PBX system connected to a conventional voicemail system.

In an example embodiment, the telephony interface 202 may communicate the incoming call (e.g. which may be communicated using Real Time Transport Protocol (RTP Control Protocol or RTCP)) to the speech recognition module 210. Prior to performing speech recognition, the actual call content (e.g. the actual voice or speech message communicated by the sender) may then be extracted from the total incoming call. Thus, in an embodiment, incoming audio or speech content (in digital or analog form) may be processed or transformed into a textual equivalent of the speech. It is however to be appreciated that the embodiments are not limited to algorithms that convert the reference words into text. In certain embodiments, the device 200 may work directly from audio words or phrases without the conversion to text. Thus, identification of one or more reference words (e.g., forming a phrase) may be performed in the audio domain where a voice message/speech is analyzed to identify one or more reference words. Based on processing in the audio domain, the Do-Not-Disturb option may be overridden.

In an example embodiment, the speech recognition may be language sensitive or provide a facility to define more than one language associated with the reference words. For example, the speech recognition module 210 may identify a source of an incoming telephone call and associate a particular language with the source of the incoming call. For example, if it is determined from caller identification information that the incoming message is a voice message from a person in France, then a French language profile, including French reference words, may be retrieved from the database 214. In an example embodiment, a user may be prompted to identify which particular language they are communicating the message in.

Figure 7:
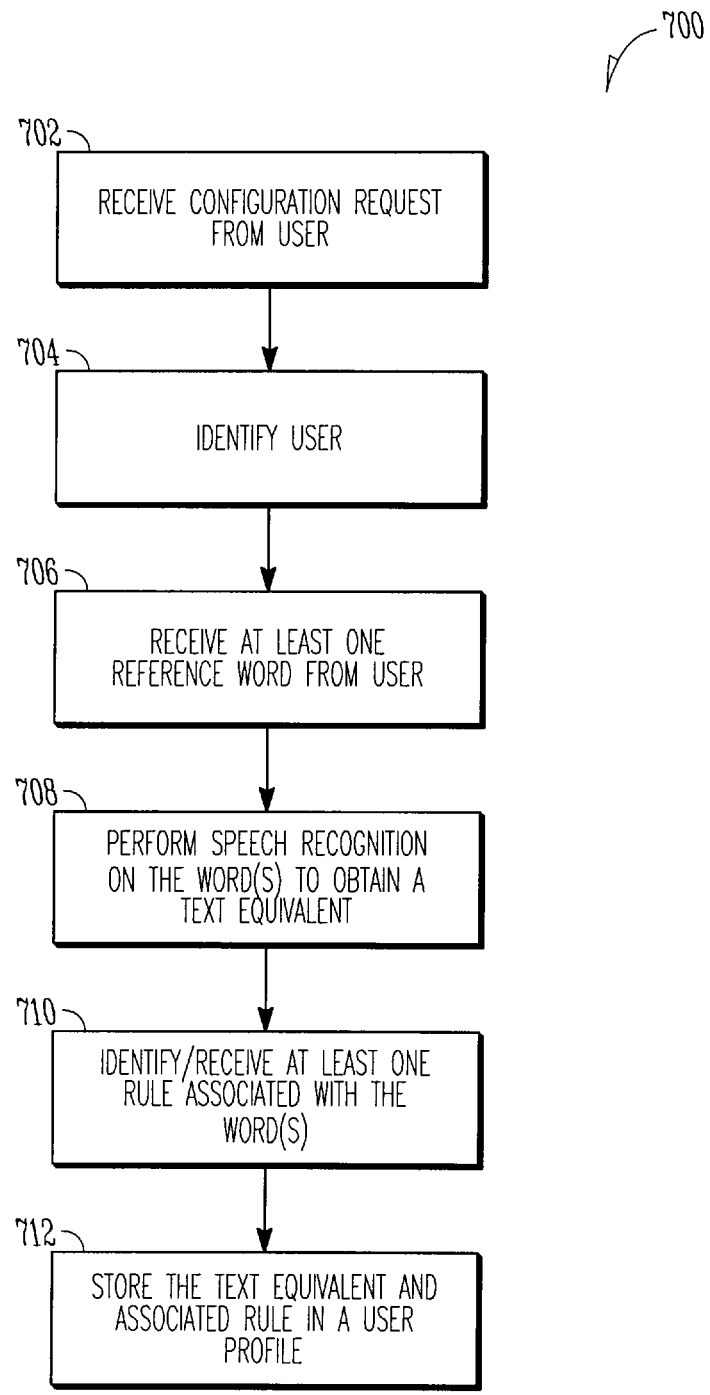
FIG. 7 shows a flow diagram of a method, in accordance with an example embodiment, to configure a Do-Not-Disturb option using speech recognition.

Referring to FIG. 7, reference 700 generally indicates a method, in accordance with an example embodiment, to configure a Do-Not-Disturb option in a telephone device. For example, the method 700 may be used to define the reference words or keywords and the associated actions in the table 300 of the device 200. It will, however, be appreciated that a single predefined single reference rule or action may be provided which merely overrides the Do-Not-Disturb option. However, in addition to or instead of overriding the Do-Not-Disturb option, other actions may be defined. For example, the method 700 may be deployed in the device 200 which may include the configuration module 218 and the configuration interface 220. For example, as shown at block 702, the user may dial in or call the device 200 and identify that the user wishes to configure his/her personal profile (e.g. personal profiles 302.1-302.m).

The method 700 may then identify the user (as shown at block 704) and receive at least one reference word from the user as shown at block 706. Thereafter, optionally, speech recognition may be performed to obtain a text equivalent of the referenced audio words received in speech from the user (see block 708). Optionally, the user may then define at least one associated action or rule that is associated with the reference word or words. For example, the action may be a call forwarding action, a Do-Not-Disturb override action, a voice mail action, or the like (see block 710). Once the reference word or words and the associated action have been identified, they may be stored in the corresponding user's personal profile (see table 300 in FIG. 3 and block 712).

It will be appreciated that multiple modalities may be provided to allow the user to configure his/her personal profile. For example, the configuration interface 220 may include a web interface that allows the user to communicate with the device 200 via the Internet. A web-based Graphical User Interface may thus be provided where the user may then, after entering a username and a password, configure the particular reference word or words which are then stored in the reference database 214. In an example embodiment, the configuration interface 220 may include an Interactive Voice Response (IVR) system which provides the user with a series of prompts to enable the user to define reference words or hot words as well as associated actions/rules such as overriding the Do-Not-Disturb option. In an example embodiment, a user may be presented with a Telephony User Interface (TUI) menu. For example the menu may prompt a user: "To listen to your voicemail messages please press 1; to set your personal preferences, please press 2; etc. . . . ." The user may then select the personal preferences option and be presented with a relevant menu. For example, the user may be prompted: "To change your outgoing message please press 1; to set your "hot words" please press 2; etc. . . . . " If the user chooses the "hot words" option, he/she may record a sequence of "hot words" which are automatically stored in his or her personal profile and associated with his or her mailbox.

Referring for example to the system 400 (see FIG. 4), when including the device 200, the speech recognition module 210 allows a user to utilizes natural language capabilities to instruct the system 400 via a spoken sentence. For example after authentication the user may hear a short prompt: "Please specify your command". In response the user may say "Please configure my three "hot words" to be "Jones", "Heart", and "status". The system 400 may then play back to the caller a confirmation message: "You have asked to configure three "hot words": "Jones", "Heart", and "status". If this is correct please acknowledge or say modify." Once the user acknowledges that the system 400 has properly recorded the three "hot words", the "hot words" may be stored in the user's personal profile (e.g., see table 300) and associated with his/her mailbox. As mentioned above, the system 400 may provide the user with the ability to program rules for the reference words. For example, the user may mark as urgent any call from Joe's phone that includes the words "Dinner" and "at", or messages that include "blood test results" regardless of the who the caller is.

If the caller utters any of the reference words, the interrogation and control module 212 may notify the PBX module 402, which may then temporarily disable the Do-Not-Disturb option, and the voice PBX module 402 may call the original called party. The call would then ring at the associated telephony endpoint device and, if user answers the call, the caller may be transferred and connected to the original called party. However, if the call is not answered by the user, then the caller may continue with the voice message. Although the various modules are shown as separate blocks it is to be understood that one or more of the modules may be combined or integrated. For example, the interrogation and control module 212, the speech recognition module 210, and the configuration module 218 may form part of the voicemail module 206.

In example embodiment, the system 400 may call the user at a per-configured alternative telephone number (e.g., home telephone number or cellular telephone number) and, when the user answers the call, the voicemail module 404 may complete the transfer of the incoming call. In this example embodiment PBX module 402 does not need to temporarily disable the DND mode.

Thus, example embodiments may allow alerting and receiving of calls by a user in Do-Not-Disturb mode based on the use of pre-configured reference word or words or "hot words" identified in speech of a caller while leaving a voice message. The user may, for example, create rules based on a combination of the reference words and the identity of the caller.

Figure 8:
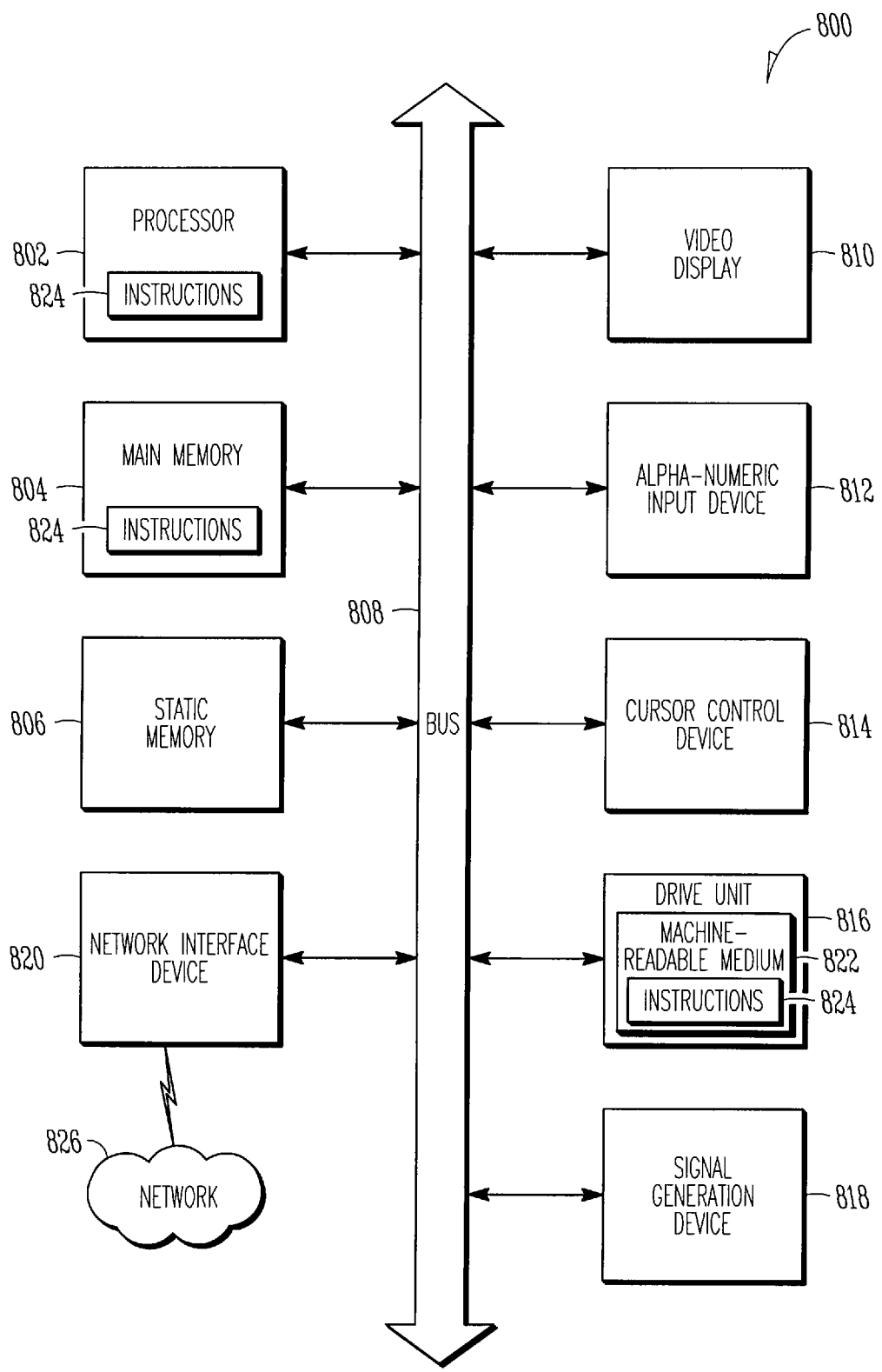
FIG. 8 shows a block diagram of a machine including instructions to perform any one or more of the methodologies described herein.

FIG. 8 shows a diagrammatic representation of machine in the example form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a voicemail system, a cellular telephone, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), optionally a user interface (UI) navigation device 814 (e.g., a mouse), optionally a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAM), read only memory (ROMs), and the like.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of processing an incoming telephone call, the method comprising:
   at a recipient telephone system,
      receiving the incoming call including speech;
      identifying when a Do-Not-Disturb option is set, the Do-Not-Disturb option identifying that a user has requested not to receive telephone calls;
      recording the incoming call in a voicemail system when the Do-Not-Disturb option is set;
      performing content analysis to identify content of the speech while recording the incoming call in the voicemail system when the Do-Not-Disturb option is set, the performance of the content analysis including performing speech recognition on the speech to obtain at least one reference word that is included in the speech;
      interrogating a reference database with the at least one reference word to identify an associated rule; and
      selectively overriding the Do-Not-Disturb option based on the associated rule.

2. The method of claim 1, which comprises conferencing in a voice path of the speech with a speech recognition module to perform the speech recognition.

3. The method of claim 2, wherein the voice path is a voice path of the voicemail system.

4. The method of claim 1, in which selectively overriding the Do-Not-Disturb option comprises temporarily disabling the Do-Not-Disturb option in a Private Branch eXchange (PBX).

5. The method of claim 1, in which the associated rule comprises communicating the call to a telephone endpoint associated with the user.

6. The method of claim 5, which comprises continuing to record the call in the voicemail system when the call is unanswered by the user.

7. The method of claim 5, which comprises:
identifying when the user is on another telephone call; and
providing an audio communication to the user at a reduced volume level that is lower than a volume level of voice communications of the other telephone call to inform the user of the incoming call.

8. The method of claim 1, which comprises identifying a caller from the content of the speech, the associated rule being associated with the caller.

9. The method of claim 1, which comprises performing the associated rule irrespective of an identity of a caller that is a source of the incoming call.

10. The method of claim 1, which comprises:
receiving a communication from a user, the communication defining the at least one reference word;
identifying at least one rule associated with the at least one reference word; and
storing the at least one reference word and the at least one rule in the reference database for interrogation when the incoming call is received.

11. The method of claim 10, which comprises:
communicating a plurality of configuration options to the user via an Interactive Voice Response (IVR) module; and
storing responses received from the user in the reference database as reference words and associated rules that are implemented when the reference words are identified in the content of the speech of the incoming call.

12. The method of claim 10, which comprises:
communicating a plurality of configuration options to the user via the Internet using a web interface; and
storing responses received from the user in the reference database as reference words and associated rules.

13. The method of claim 1, which comprises storing a personal profile of reference words and associated rules for each of a plurality of users associated with the recipient telephone system.

14. A method of configuring a Do-Not-Disturb option in a telephone system, the method comprising:
receiving at least one reference word and an associated rule from a user, the Do-Not-Disturb option identifying when a user has requested not to receive telephone calls and the associated rule selectively modifying operation of the Do-Not-Disturb option, wherein the associated rule includes identifying the at least one reference word included in an incoming call while recording the incoming call in a voicemail system when the Do-Not-Disturb option is set, the identification of the at least one reference word including performing speech recognition analysis on speech included in the incoming call to obtain the at least one reference word; and
storing the reference word and associated rule received from the user in the reference database for a subsequent interrogation with the reference word to identify the associated rule.

15. An apparatus to process an incoming telephone call, the apparatus comprising:
a telephony interface to receive the incoming call including speech;
a Do-Not-Disturb identification module to identify when a Do-Not-Disturb option is set, the Do-Not-Disturb option identifying that a user has requested not to receive telephone calls;
a voicemail system to record the incoming call when the Do-Not-Disturb option is set;
an analysis module to identify content of the speech while recording the incoming call in the voicemail system when the Do-Not-Disturb option is set, the analysis module being configured to perform speech recognition on the speech to obtain at least one reference word that is included in the speech;
a reference database; and
an interrogation module to interrogate the reference database based on the content to identify an associated rule, the Do-Not-Disturb option being selectively overridden based on the associated rule, the interrogation module being configured to interrogate the reference database with the at least one reference word to identify the associated rule.

16. The apparatus of claim 15, wherein a voice path of the speech is conferenced in with a speech recognition module to perform the speech recognition.

17. The apparatus of claim 16, wherein the voice path is a voice path of the voicemail system.

18. The apparatus of claim 15, in which the Do-Not-Disturb option selectively overridden by temporarily disabling the Do-Not-Disturb option in a Private Branch eXchange (PBX).

19. The apparatus of claim 18, in which the associated rule identifies that the ca is to be communicated to a telephone endpoint associated with the user.

20. The apparatus of claim 19, wherein the voicemail system continues to record the call when the call is unanswered by the user.

21. The apparatus of claim 19, wherein, when the user is on another telephone call, an audio communication is provided to the user at a reduced volume level that is lower than a volume level of voice communications of the other telephone call to inform the user of the incoming call.

22. The apparatus of claim 15, wherein a caller is identified from the content of the speech, the associated rule being associated with the caller.

23. The apparatus of claim 15, wherein the associated rule is performed irrespective of an identity of a caller.

24. The apparatus of claim 15, which comprises a user interface receiving a communication from a user, the communication defining the at least one reference word, the interrogation module identifying at least one rule associated with the at least one reference word, the at least one reference word and the at least one rule being stored in the reference database for interrogation when the incoming call is received.

25. The apparatus of claim 24, wherein a plurality of configuration options are communicated to the user via an Interactive Voice Response (IVR) module, and responses received from the user being stored in the reference database as reference words and associated rules.

26. The apparatus of claim 24, wherein a plurality of configuration options are communicated to the user via the Internet using a web interface, responses received from the user being stored in the reference database as reference words and associated rules.

27. The apparatus of claim 15, in which a personal profile of reference words and associated rules is stored for each of a plurality of users associated with the recipient telephone system.

28. An apparatus for configuring a Do-Not-Disturb option in a telephone system, the apparatus comprising:
- a user interface to receive at least one reference word and an associated rule from a user, the Do-Not-Disturb option identifying when a user has requested not to receive telephone calls and the associated rule selectively modifying operation of the Do-Not-Disturb option, wherein the associated rule includes identifying the at least one reference word included in an incoming call while recording the incoming call in a voicemail system when the Do-Not-Disturb option is set, the identification of the at least one reference word including performing speech recognition analysis on speech included in the incoming call to obtain the at least one reference word; and
- a reference database to store the reference word and associated rule received from the user in the reference database for a subsequent interrogation with the reference word to identify the associated rule.

29. A non-transitory tangible machine-readable medium embodying instructions to process an incoming telephone call, the instructions when executed by a machine causes the machine to:
- receive the incoming call including speech;
- identify when a Do-Not-Disturb option is set, the Do-Not-Disturb option identifying that a user has requested not to receive telephone calls;
- record the incoming call in a voicemail system when the Do-Not-Disturb option is set;
- perform content analysis to identify content of the speech while recording the incoming call in the voicemail system when the Do-Not-Disturb option is set, the performance of the content analysis including performing speech recognition on the speech to obtain at least one reference word that is included in the speech:
- interrogate a reference database with the at least one reference word to identify an associated rule;
- selectively override the Do-Not-Disturb option based on the associated rule.

30. An apparatus to process an incoming telephone call; the apparatus comprising:
- means for receiving the incoming call including speech;
- means for identifying when a Do-Not-Disturb option is set, the Do-Not-Disturb option identifying that a user has requested not to receive telephone calls;
- means for recording the incoming call in a voicemail system when the Do-Not-Disturb option is set;
- means for identifying content of the speech while recording the incoming call in the voicemail system when the Do-Not-Disturb option is set, the content-identifying means operating to perform speech recognition on the speech to obtain at least one reference word that is included in the speech;
- a reference database; and
- means for interrogating the reference database with the at least one reference word to identify an associated rule, the Do-Not-Disturb option being selectively overridden based on the associated rule.

31. The method of claim 1, wherein the recorded speech includes a message directed to the user.

32. The method of claim 1, wherein the identified content of the speech includes a language profile of the speech.

* * * * *

UNITED STATES PATENT AND TRADEMARK OFFICE
CERTIFICATE OF CORRECTION

| | | |
|---|---|---|
| PATENT NO. | : 8,625,749 B2 | Page 1 of 1 |
| APPLICATION NO. | : 11/277295 | |
| DATED | : January 7, 2014 | |
| INVENTOR(S) | : Jain et al. | |

It is certified that error appears in the above-identified patent and that said Letters Patent is hereby corrected as shown below:

In the Claims:

In column 10, line 32, in Claim 19, delete "ca" and insert --call--, therefor

In column 12, line 3, in Claim 29, delete "speech:" and insert --speech;--, therefor In column 12, line 5, in Claim 29, after "rule;", insert --and--, therefor In column 12, line 8, in Claim 30, delete "call;" and insert --call,--, therefor Signed and Sealed this
Tenth Day of June, 2014

Michelle K. Lee
*Deputy Director of the United States Patent and Trademark Office*